United States Patent
Notz

(10) Patent No.: US 8,123,989 B2
(45) Date of Patent: Feb. 28, 2012

(54) METHOD AND DEVICE FOR CONTROLLING A LINEAR MOTION AXIS

(75) Inventor: Markus Notz, Schwändi (CH)

(73) Assignee: Netstal Maschinen AG, Naefels (CH)

( * ) Notice: Subject to any disclaimer, the term of this patent is extended or adjusted under 35 U.S.C. 154(b) by 130 days.

(21) Appl. No.: 12/738,212

(22) PCT Filed: Oct. 16, 2008

(86) PCT No.: PCT/EP2008/063989
§ 371 (c)(1),
(2), (4) Date: Apr. 15, 2010

(87) PCT Pub. No.: WO2009/050246
PCT Pub. Date: Apr. 23, 2009

(65) Prior Publication Data
US 2010/0283186 A1  Nov. 11, 2010

(30) Foreign Application Priority Data
Oct. 19, 2007  (CH) ....................................... 1637/07

(51) Int. Cl.
*B29C 45/50* (2006.01)
*B29C 45/82* (2006.01)

(52) U.S. Cl. .................... 264/40.1; 264/328.1; 425/145; 425/587

(58) Field of Classification Search ................. 264/40.1, 264/40.7, 328.1, 328.17; 425/145, 149, 150, 425/587
See application file for complete search history.

(56) References Cited

U.S. PATENT DOCUMENTS
4,579,515 A * 4/1986 Kawaguchi et al. .......... 425/136
(Continued)

*Primary Examiner* — Jill Heitbrink
(74) *Attorney, Agent, or Firm* — Henry M. Feiereisen; Ursula B. Day

(57) ABSTRACT

The invention relates to a method and device for controlling a linear motion axis, particularly of the injection screw (43) or a melt piston for an injection molding machine. Said device comprises a hydraulically driven piston (45) having a piston chamber (A) and a rod chamber (B). According to the solution proposed by the invention, at least one process phase is controlled/regulated by means of two parallel proportional valves, an injection valve (1) and a metering valve (2). The two proportional valves can be connected in parallel or in combination. The control/regulation of the driven piston (45) preferably uses digital technology. An enormous reduction in energy consumption and smooth transitions between the process phases are achieved with a hydraulic linear drive.

21 Claims, 6 Drawing Sheets

U.S. PATENT DOCUMENTS

| | | | | |
|---|---|---|---|---|
| 4,712,991 A | * | 12/1987 | Hehl | 425/145 |
| 5,238,147 A | * | 8/1993 | Yasui et al. | 222/1 |
| 5,443,782 A | | 8/1995 | Nakamura et al. | |
| 5,474,733 A | * | 12/1995 | Koide et al. | 264/328.1 |
| 5,513,971 A | | 5/1996 | Nakamura et al. | |
| 2003/0090018 A1 | | 5/2003 | Bulgrin | |

* cited by examiner

METHOD AND DEVICE FOR CONTROLLING A LINEAR MOTION AXIS

CROSS-REFERENCES TO RELATED APPLICATIONS

This application is the U.S. National Stage of International Application No. PCT/EP2008/063989, filed Oct. 16, 2008, which designated the United States and has been published as International Publication No. WO 2009/050246 and which claims the priority of Swiss Patent Application, Serial No. 01637/07, filed Oct. 19, 2007, pursuant to 35 U.S.C. 119(a)-(d).

TECHNICAL FIELD

The invention relates to a method for controlling different process phases of linear motion axes, particularly of the injection screw or the melt piston in an injection moulding machine with a hydraulically linearly driven piston with a piston chamber and a rod chamber, in addition a device for controlling a linear motion axis, particularly of the injection screw or the melt piston of an injection moulding machine with a hydraulically linearly drivable piston with a piston chamber and a rod chamber.

PRIOR ART

All the operating phases of an injection cycle are ensured today in hydraulic injection moulding machines with digital regulation technology and in fully electrical injection moulding machines by means of servo motors and corresponding control-/regulating arrangements with the highest standards of quality. In the case of electrical machines, this includes active braking processes also being able to be kept fully under control.

The most recent development has shown that fully electrical machines can be operated in a substantially more optimum manner with regard to energy, compared with hydraulic machines. In the case of a hydraulic drive with valve regulation, a large proportion of the energy is destroyed irreversibly by throttle processes in the region of the edges of the valve pistons. From the point of view of mechanical engineering, hydraulic drives permit simpler designs, through conduits as desired, than electrical drives. Limits are set on the arrangement of electric motors with the necessary transmissions, so that structural compromises with corresponding multiple uses are often necessary. According to an established rule of thumb, a fully electric injection moulding machine is as a whole approximately 20% more expensive than a hydraulically driven injection moulding machine. The saving on energy in electrically driven machines can be 20%-30%, particularly also through recuperation of the braking energy. From these factors, there is a basic requirement to improve hydraulic solutions to the aim of an optimum activation with regard to energy, especially the linear movement of the injection screw.

US 2003/0090018 shows a solution of the prior art for a hydraulic drive. Reference is to be made in this regard to FIG. 1 (corresponds to FIG. 1A of the named US patent publication). This figure gives a diagrammatic overview of the solution. On the left half of the drawing, the two mould halves are illustrated with the mould closure, on the right half of the drawing, the injection unit is illustrated with a hydraulic linear drive for the injection screw. Both oil circuits are supplied via a pump. The pressure oil is fed and removed in each case via a regulating valve of the respective piston chamber or rod chamber, this being as a function of the respective process phase. The energy comparison between electrical and hydraulic drive, mentioned in the introduction, applies to this solution.

FIG. 2 shows an improved solution of the prior art, as is constructed with good success by the applicant. The essential difference from older solutions lies in that here, for the process phase "screw withdrawal", a simple quick shift valve can be switched on. This already brings a substantial improvement with regard to energy optimization.

An essential disadvantage of all hydraulic solutions of the prior art lies in that hydraulic surges can occur in the phase transitions, particularly with regard to the injection screw.

SUMMARY OF THE INVENTION

The new invention was set the following problem with regard to the optimization of a hydraulic drive:

A best possible energy optimization is to be achieved with a hydraulic drive.

An activation of the piston chamber (A) and of the rod chamber (B) is to be made possible by means of position regulation.

In particular, all the transitions of the different phases within an entire injection cycle are to take place in as surge-free a manner as possible.

The method according to the invention is characterized in that the driven piston is controlled/regulated via two proportional valves, able to be connected in parallel and individually and able to be combined, an injection valve and a metering valve.

The device according to the invention is characterized in that the device for controlling the different process phases, in particular the injection screw, has two proportional valves, able to be controlled individually and in parallel, an injection valve and a metering valve.

Proceeding from the fact:
a) that the hydraulic cylinder also offers an effective and sufficiently large area on the side of the rod chamber (B) for active braking processes and
b) the piston chamber (B) has an effective surface here of 20% to 40% of the piston face (A), the new invention, with the combination of two proportional valves, proceeds from the following knowledge:
c) Valuable energy is not to be destroyed by the mere discharging of high pressure oil via valve edges.
d) In the positioning regulation of the piston, a force balance is to be able to be set, so that the chamber pressure (B) can swing to a higher level proportionately with respect to the piston faces (A).
e) During the metering process, the advance movement of the screw produces a back pressure as a result of rotation with the melt conveying and the feed.
f) On screw withdrawal and on injection, it is advantageous if the position regulation can be carried out with a sliding setpoint (speed regulation/position measurement).
g) By active controlling on both sides of the piston faces, both acceleration- and also braking processes can be managed in both directions to a maximum extent. Thereby, the individual process phases are able to be managed via a position regulation, and surge-free phase transitions are made possible.
h) The after-pressure regulation is preferably embodied with a pressure absorber in each case in the chambers A and B.

In particular also on the basis of particularly advantageous developments, the new invention allows each phase transition to be designed so as to be almost surge-free, the back pressure regulation to be carried out without consumption of pressure oil, whereby energy can be saved, the digital control of the two parallel proportional valves and the optimization of the energy consumption ensuring the method parameters, all phase transitions to be controlled in a position-controlled/regulated manner.

The invention may include one or more of the following advantageous embodiments.

The control/regulation, in particular also in the phase transitions, can be carried out with the hydraulic drive as with the known drive solutions, so that ultimately a correspondingly optimum management of the entire injection process becomes possible also with respect to a hydraulic linear drive. However, this means that at least with respect to the linear screw drive a parity to an electric drive becomes possible, but with the advantages of a hydraulic solution. The new invention can also bring advantages on the side of the mould closure with quite high outputs with the use of two large parallel proportional valves. As is shown below, however, the advantages are brought to bear quite particularly in the process phases with a large energy consumption of an injection screw or an injection piston.

Quite particularly preferably, to increase performance, at least of one process phase, the two proportional valves are connected in parallel. In the course of each injection cycle, the two proportional valves can be combined or used in various ways. Advantageously, during the injection phase both valves are activated simultaneously, wherein with a high output both proportional valves are connected in parallel to double the output and with a lower output, the two proportional valves are activated differently. The injection movement is preferably operated primarily with the injection valve and the flow P to A is supported by the metering valve.

In addition to the fact of using two proportional valves of the same overall size, the specifically adapted edge geometry, in particular of the metering valve, is an essential reason for the quite particularly advantageous effect of the new solution. The valve edges of the valve pistons, relevant with regard to the energy loss, in particular of the metering valve, are cut so as to be tapered for an optimum control with a small throughflow of less than 15% of the greatest output.

Advantageously, however, the relevant edges of the injection valve are also provided with a taper. In the metering valve, the edge cut on the valve piston can be over one millimeter in the longitudinal direction of the piston and up to a few tenths of a millimeter in diameter. For economic reasons, in both cases proportional valve housings of standard series can be used, with the particular development requiring a special geometry of the piston edges.

In addition, it is proposed that in the phase of keeping position of the injection screw and/or screw withdrawal, only the injection valve is effective, with the metering valve remaining closed in the covering region.

During the dosing phase, a connection of the two chambers A and B is brought about by means of a special structural configuration, in particular of the valve edge geometry. Here, with an increasing deflection of the metering valve in the quadrant of metering regulation, the oil flow is conveyed from both cylinder chambers (A+B) to the tank. Here is one of the main points for energy saving, which allow a hydraulic drive to be operated in a similar energy-saving manner to an electric drive.

It is, in addition, proposed that the drive of the injection screw is produced in the metering direction by the degree of advancement of the injection screw as a result of rotation, wherein the regulation takes place passively by throttling the oil flow to the tank, and in this process the injection remains closed with its covering. A defined counter force is produced to the force on the screw, caused by the granulate feed and the screw rotation, by a controlled outflow of the pressure oil from the large chamber (A) into the small chamber (B), wherein at the same time the difference of the chamber volumes is discharged in a controlled manner into the tank.

Advantageously, with an asymmetrical cut of the valve edges, a corresponding connection of the two chambers and for the fine range is able to be produced. For this, connecting lines to the chambers A and B are arranged between the injection valve and the metering valve, which lines permit a simultaneous supply and removal of oil, both with regard to the piston chamber and the rod chamber.

The device preferably has a shared pump and a shared tank, with the oil flow or respectively the oil pressure of the individual process phases being able to be ensured by means of the controlling of the two proportional valves and by means of a pressure sensor in each case in the piston chamber or respectively in the rod chamber. The device has, in addition, means for the controlling/regulating of the process phases in digital control-/regulating technology for the coordinated activation, optimum with regard to energy, of the two proportional valves which are arranged in parallel.

Particularly preferably, the relevant edges of the piston of the injection valve are cut differently to the relevant edges of the metering valve, or they have different tapers in each case.

A great advantage consists in that two smaller valves from a mass production can be cheaper than one correspondingly much larger special valve. A not insignificant point, in addition, lies in that during the metering phase a connection of the two chambers A and B is produced by means of asymmetrical cutting of the valve edges with the metering valve. The optimum activation with regard to energy is assisted by the asymmetrical cut of the valve edges. In the phase of metering regulation, with an increasing deflection of the metering valve in the quadrant of the metering regulation, the oil flow is conveyed to the tank. The energy loss is thereby reduced quite particularly in this phase. The phase of pressure regulation is ensured solely by the injection valve. Preferably, the regulation is carried out here in the fine range of the pressure in the covering region of the injection valve.

DETAILED DESCRIPTION OF PREFERRED EMBODIMENTS

Figure 1:
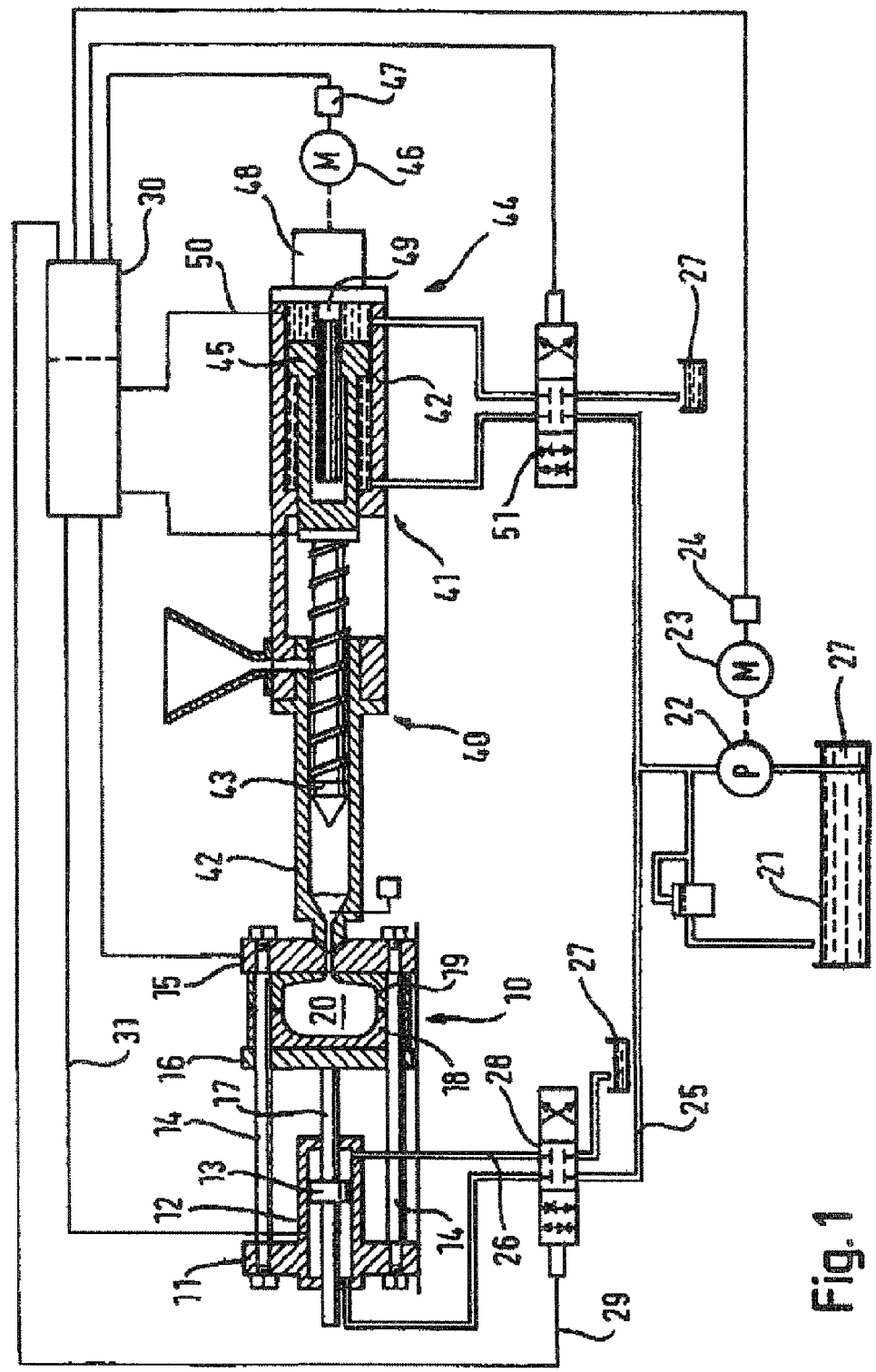
FIG. 1 shows a solution of the prior art.

Reference is made below to FIG. 1. This shows a known solution of the prior art according to US 2003/0090018. In the left-hand side of the drawing is the mould closure 10, which has a carrier plate 11 and a mould closure cylinder 12 with a drive piston 13. The carrier plate 11 is connected via bars 14 with the fixed tool clamping plate 15 on the injection side. The movable tool clamping plate 16 is connected with the piston rod 17. One mould half 18 or respectively 19 is arranged in each case on the corresponding tool clamping plates 15, 16, said mould halves together forming a mould cavity 20. The hydraulic pressure medium 21 is conveyed via a pump 22, a drive motor 23 with servo drive 24 via a pressure line 25 to the rear side of the piston. In the case of mould closure, the pressure medium is discharged into the tank 27 via a further line 26. The forward and backward movement of the drive piston 13 is ensured via a valve 28 via a corresponding control arrangement 30 and a control line 29. The necessary pressure is controlled via a sensor and a corresponding signal line 31 from the control arrangement 30. On the right-hand side of the drawing, the injection unit 40 is illustrated with a drive group 41. The injection unit 40 has an injection cylinder 42, an injection screw 43 and a drive group 44. The drive group 44 consists of a hydraulic drive with hydraulic piston 45 for the linear movement of the injection screw 43 and with an electromotive drive 48 with electric motor 46 with servo drive 47 for the rotary movement of the injection screw 43. The transmission from the electric motor 46 to the hydraulic piston 45 takes place via a toothed shaft 49, which engages in a sliding manner in the hydraulic piston 45 in linear direction. The necessary pressure for the injecting is monitored via a sensor with signal line 50 likewise from the control arrangement and is regulated by means of a valve 51. The great disadvantage of this solution lies in that too much energy is destroyed in particular in the back pressure regulation, and surges occur at the phase transitions.

Figure 2:
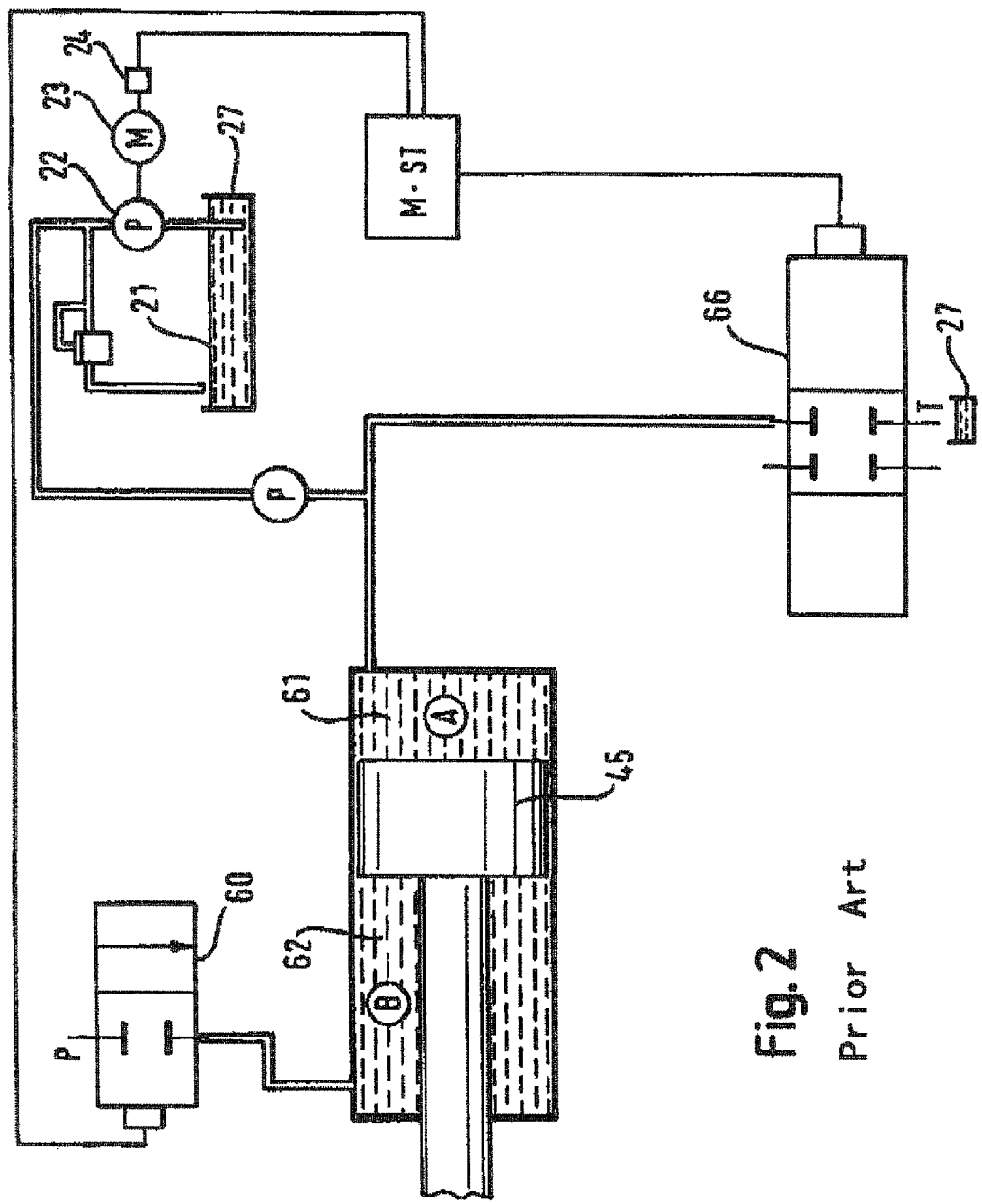
FIG. 2 shows a further solution of the prior art, corresponding to the carrying out of practice hitherto by the applicant.

FIG. 2 shows a further solution of the prior art. Here, an additional simple quick shift valve 60 is used for the screw withdrawal. The pressure P on the side of the piston chamber (A) or respectively 61 is regulated in an analogous manner to the solution according to FIG. 1. The pressure on the side of the rod chamber (B) or respectively 62 is additionally controlled. The movement of the piston rod is monitored. The main valve is a proportional valve 66, via which all hydraulic movements, including pressure build-up, are controlled or respectively regulated. In the illustrated solution, the energy requirement can in fact be optimized, but the surges at the phase transitions can not be avoided.

Figure 3:
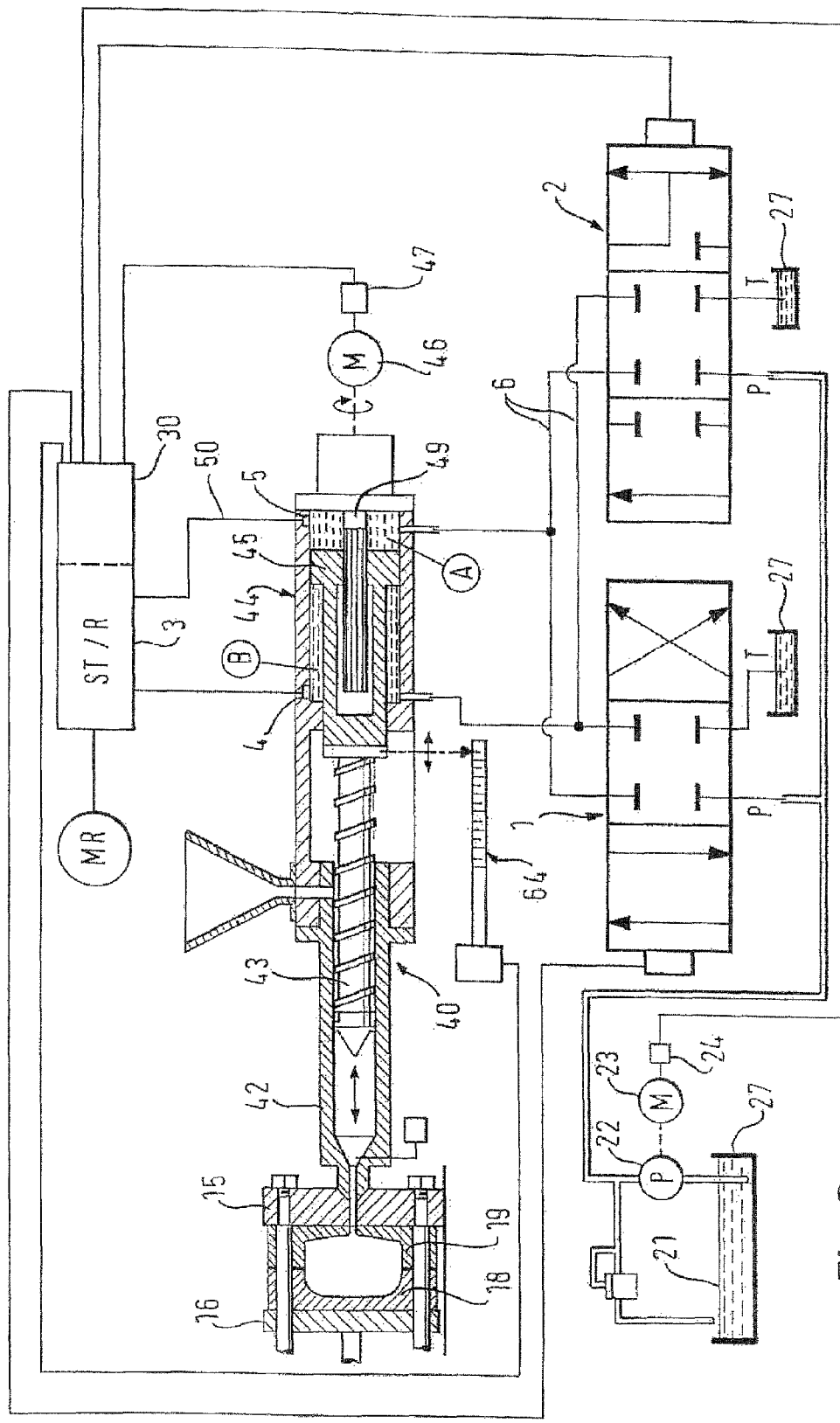
FIG. 3 shows the solution according to the invention, with two proportional valves.

FIG. 3 shows the solution according to the invention. The central idea lies in that two special proportional valves, an injection valve 1 and a metering valve 2, are used for the control/regulation. One of the main tasks of the metering valve 2 is the dosing regulation. For this, it has a special edge geometry of the metering valve pistons. The second central idea lies in that a device can now be used for controlling 3 of the different processes phases, corresponding to the controlling/regulating arrangement in electrical drives. According to the new invention, all the process phases can be controlled by digital regulating/control technology. Here, the entire oil flow, the pressure build-up, in particular the phase transitions, including braking processes, are handled with the greatest precision. On the basis of the new invention, it has been recognized that this highest degree of management of all process phases is able to be achieved only through the possibility of the coordinated controlling/regulating of two proportional valves 1 and 2. The valves 1 and 2 are controlled and regulated in parallel, partially supporting or individually. A particular asymmetrical cut of the valve edges supports the phase transitions and the fine regulation of the hydraulic piston. The new invention makes possible a great energy saving and the avoidance of hydraulic surges. Instead of one large special valve to increase the output, the material costs for two smaller valves are comparatively modest. The pressure of the hydraulic medium is monitored or respectively controlled in both piston chambers via pressure sensors 4 or respectively 5 from the control device 3. The back pressure regulation can be optimized with regard to energy consumption in the dosing process as a passive discharging of the oil stream by the solution, through a special edge geometry. The movement of the piston is monitored via a position measuring arrangement 64.

In FIG. 3, the tank 27 is illustrated three times as a diagrammatic illustration. In practice, however, only one shared tank is used. The flow of the hydraulic medium can be directed via connecting lines 6 both between the two chambers A and B and also to the tank.

Figure 4:
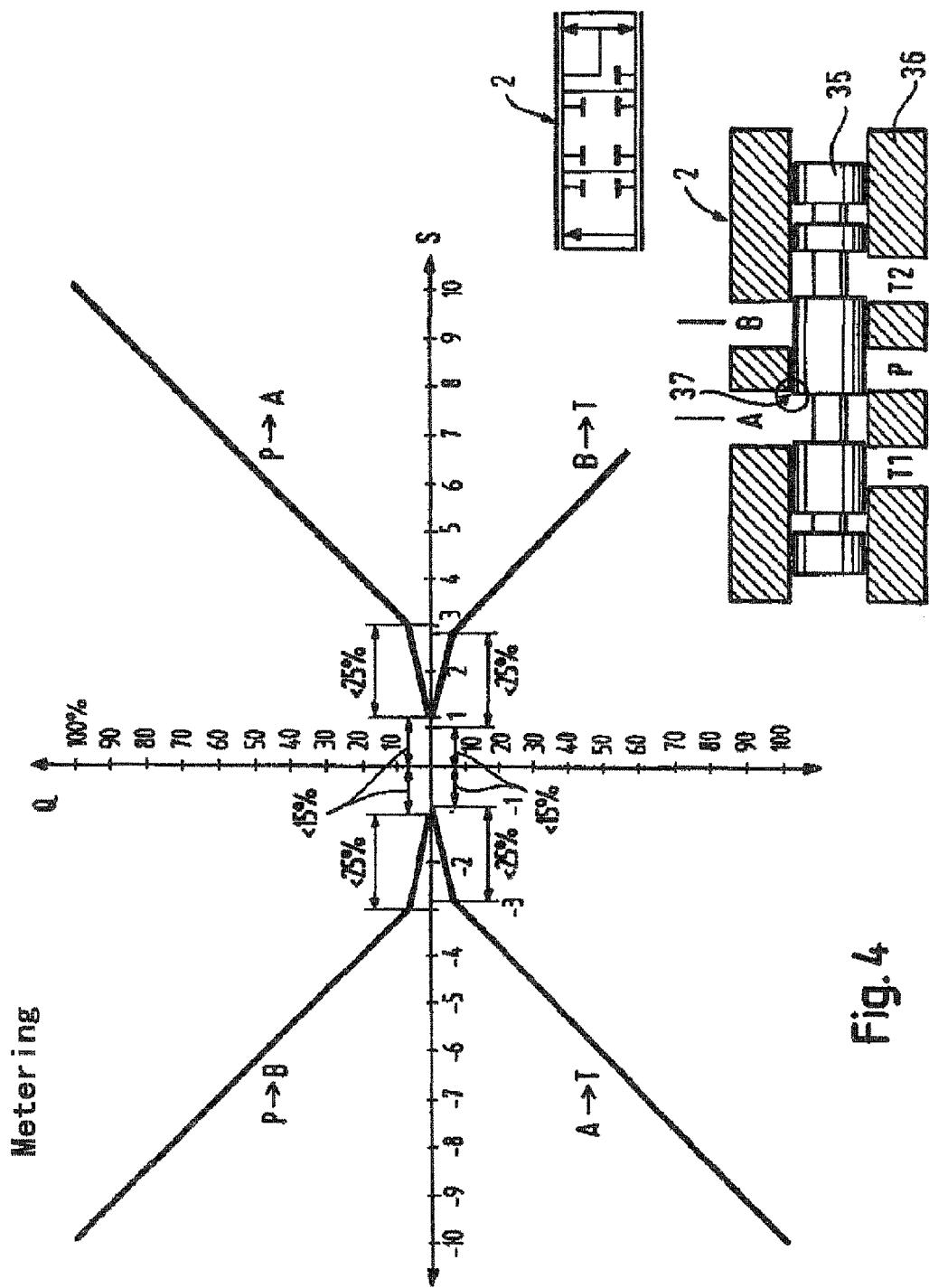
FIG. 4 shows the ratio of the oil flow Q in relation to the slider position S of the metering valve.

FIG. 4 shows typical valve characteristics for the metering valve. The oil flow Q is represented in the vertical and the corresponding slider position S in the horizontal. The phase transitions and the fine ranges of less than 25% of the maximum output can clearly be seen. On the right, the associated metering valve is illustrated as a figure and as a diagram.

Figure 5:
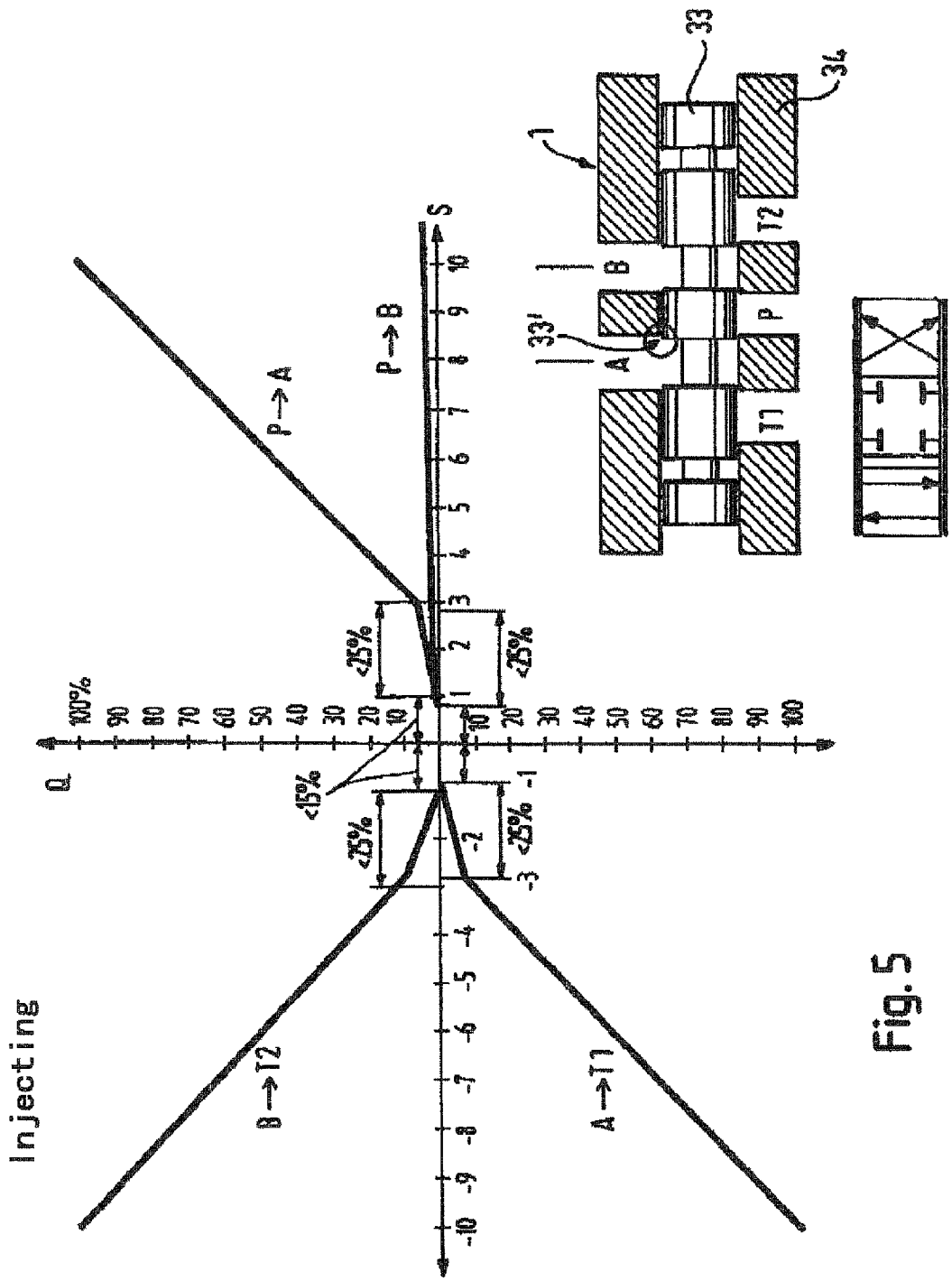
FIG. 5 shows the ratio of the oil flow Q in relation to the slider position S of the injection valve.

FIG. 5 shows the corresponding characteristics for the injection valve, corresponding to FIG. 4.

The new invention allows a whole number of advantages to be realized in hydraulic drives:

Instead of one large special valve, two standard valves, reduced in nominal size, can be installed.

On metering, no feeding in of high-grade pressure oil into the chamber B is necessary.

A controlled oil discharge regulation is possible to hold a back pressure.

The back pressure regulation is produced by the degree of advancement of the screw rotation.

Up to 30% of the applied output can be reduced. This is remarkable, when one considers that already in larger machines of the applicant, 15-20 kW can be saved.

The fine regulation can be optimized both in the range less than 15% and also 25% of the maximum output and surges can be avoided.

Figure 6A:
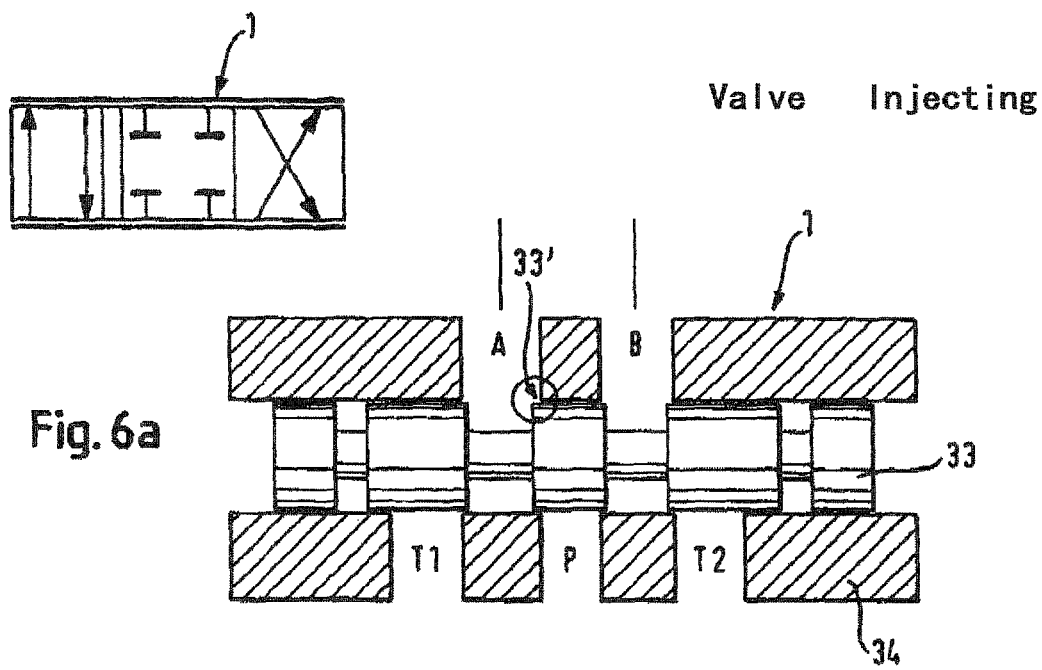
FIGS. 6a and 6b show the special structural development of the "injecting" (FIG. 6a) and "metering" (FIG. 6b) valves also with respect to the valve edges.

FIG. 6a shows the injection valve 1 with the special embodiment of the valve piston 33, of the valve housing 34 and of the piston edges 33'. The two valves, "injecting" 1 and "metering" 2 are illustrated in each case on the top left purely diagrammatically and below as a figure.

Figure 6B:
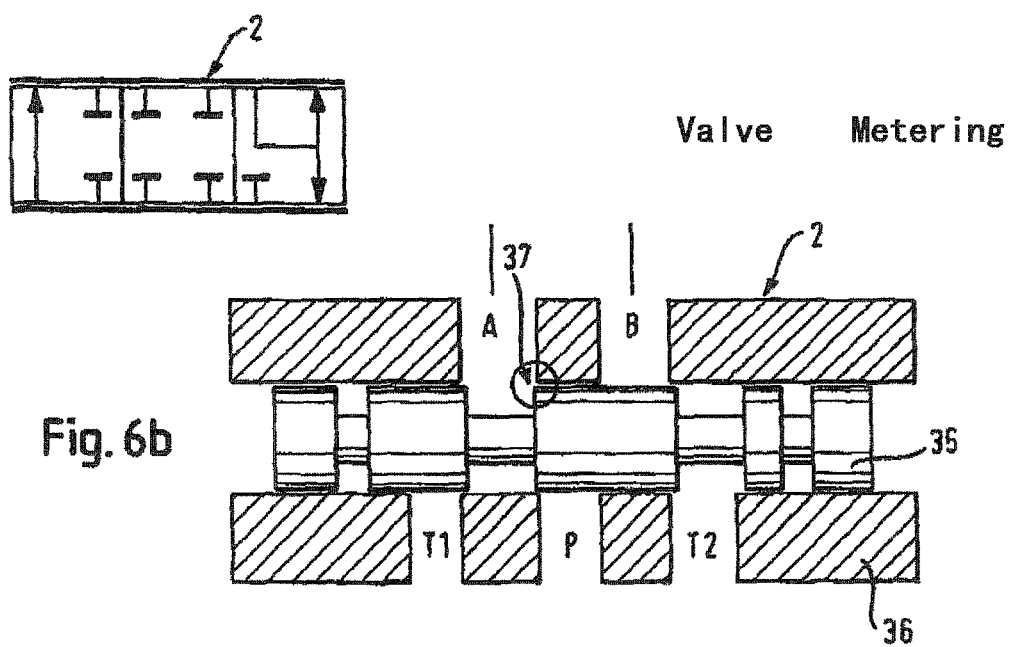

FIG. 6b shows the metering valve 2 with a valve piston 35, a valve housing 36 with the specific piston edges 37 corresponding to the metering function. The geometry of the valve piston 35 deviates greatly from that of a standard valve.

The invention claimed is:

1. A method for controlling different process phases of an injection molding machine having an injection screw or a melt piston moved by a hydraulically linearly driven piston defining a piston chamber and a rod chamber, said different process phases including a metering phase, an injection phase and a dwell pressure phase, the method comprising the steps of controllably driving the piston by way of a proportional injection valve and a proportional metering valve, said proportional injection valve and said proportional metering valve switchably connected to operate in parallel or individually, and connecting the piston chamber and the rod chamber during the metering phase.

2. The method according to claim 1, wherein the piston chamber and the rod chamber are connected during the metering phase by the metering valve, wherein a valve piston of the proportional metering valve has a special edge geometry.

3. The method according to claim 1, and further increasing deflection of the metering valve into a quadrant of metering regulation, thereby draining oil flow from both the piston chamber and the rod chamber to an oil tank.

4. The method according to claim 3, wherein the injection screw is advanced in the metering direction through rotation of the injection screw, said advance being controlled passively by throttling oil flow to the oil tank, while the injection valve remains closed during the advance by way of an overlap.

5. The method according to claim 1, wherein the proportional injection valve and the proportional metering valve are connected in parallel to increase power.

6. The method according to claim 1, wherein during the injection phase, both the proportional injection valve and the proportional metering valve are actuated simultaneously and connected in parallel to produce a high output power, and are actuated differently to produce a smaller output power.

7. The method according to claim 6, wherein in the injection phase the injection screw or melt piston is moved primarily with the proportional injection valve, whereas flow from a pressure side to the piston chamber is supported by the proportional metering valve.

8. The method according to claim 2, wherein edge geometry has a conical taper for controlling flow at a flow rate of 25% or 15% of a maximum flow rate.

9. The method according to claim 1, wherein in a process phase where a position of the injection screw or melt piston is maintained or the injection screw or melt piston is retracted, only the proportional injection valve is effective, whereas the proportional metering valve remains closed by way of an overlap.

10. The method according to claim 1, wherein controlled flow of oil from the piston chamber into the rod chamber produces a counter pressure to a force applied on the injection screw or melt piston by granulate intake and injection screw rotation, with a volume difference between volumes of the piston chamber and the rod chamber being drained into an oil tank.

11. The method according to claim 1, wherein the proportional injection valve controls pressure in the dwell pressure phase, while the proportional metering valve remains inactive.

12. The method according to claim 11, wherein fine control of the pressure is performed in the overlap range of the proportional injection valve.

13. The method according to claim 1, wherein the phase transitions are controlled by position control.

14. A device for controlling different process phases of an injection molding machine having an injection screw moved by a hydraulically linearly driven piston defining a piston chamber and a rod chamber, said different process phases including a metering phase, an injection phase and a dwell pressure phase, the device comprising:
a proportional injection valve and a proportional metering valve connected to the piston chamber and the rod chamber, and
a controller configured to control the proportional injection valve and the proportional metering valve individually or in parallel,
wherein the piston chamber and the rod chamber are connected during the metering phase.

15. The device according to claim 14, wherein the proportional injection valve and a proportional metering valve comprise valve edges having an asymmetric cut, said asymmetric cut enabling controlled flow at a flow rate of less than 25% flow or less than 15% flow of a maximum flow rate.

16. The device according to claim 14, further comprising connecting lines connecting the piston chamber and the rod chamber and arranged between the proportional injection valve and the proportional metering valve, said connecting lines configured to simultaneously supply oil to and remove oil from both the piston chamber and also the rod chamber.

17. The device according to claim 14, further comprising a common pump and a common tank, with the controller controlling at least one of oil flow and oil pressure of the different process phases by way of the proportional injection valve and the proportional metering valve and a pressure sensor disposed in the piston chamber or the rod chamber.

18. The device according to claim 14, wherein the controller is implemented as a digital controller.

19. The device according to claim 14, wherein the controller is configured to control the proportional injection valve and the proportional metering valve, when connected in parallel, so as to optimize energy efficiency of the injection molding machine.

20. The device according to claim 14, wherein edges of a piston of the proportional injection valve are ground differently from edges of a piston of the proportional metering valve.

21. The device according to claim 14, wherein edges of a piston of the proportional injection valve have a taper that is different from a taper of edges of a piston of the proportional metering valve.

* * * * *